United States Patent [19]

Ito

[11] Patent Number: 4,802,015

[45] Date of Patent: Jan. 31, 1989

[54] IMAGE REPRODUCING APPARATUS

[75] Inventor: Kazuhiko Ito, Tokyo, Japan

[73] Assignee: Canon Kabushiki Kaisha, Tokyo, Japan

[21] Appl. No.: 892,699

[22] Filed: Aug. 1, 1986

[30] Foreign Application Priority Data

Aug. 2, 1985 [JP] Japan .................................. 60-170819
Aug. 2, 1985 [JP] Japan .................................. 60-170820

[51] Int. Cl.$^4$ ............................................. H04M 9/79
[52] U.S. Cl. ...................................... 358/310; 358/34; 358/312; 358/317
[58] Field of Search ............... 358/310, 312, 314, 317, 358/318, 26, 27, 33, 34, 17, 18, 26; 360/33.1, 38.1

[56] References Cited

U.S. PATENT DOCUMENTS

| | | | |
|---|---|---|---|
| 4,114,179 | 9/1978 | Ilieve | 358/34 |
| 4,183,050 | 1/1980 | Tsuchiya et al. | 358/34 |
| 4,357,628 | 11/1982 | Wharton | 358/317 |
| 4,430,674 | 2/1984 | Taguchi et al. | 358/317 |
| 4,451,857 | 5/1984 | Mikado | 358/312 |
| 4,470,076 | 9/1984 | Arai et al. | 358/312 |
| 4,506,292 | 3/1985 | Newton et al. | 358/34 |
| 4,553,125 | 11/1985 | Baumeister | 358/312 |
| 4,617,590 | 10/1986 | Dann | 358/34 |
| 4,682,211 | 7/1987 | Kaji | 358/34 |

Primary Examiner—Russell E. Adams
Attorney, Agent, or Firm—Robin, Blecker & Daley

[57] ABSTRACT

Disclosed is an apparatus comprising means for synchronizing the line sequential signal contained in the video signal, means for judging the kind of the line sequential signal for every horizontal frequency period, means for statistically processing the judging result by the judging means so as to control the synchronization means according to the process result, and means for suspending the display of the video signal in the displayer so as to compensate the statistically process according to the state of the suspending means.

31 Claims, 7 Drawing Sheets

IMAGE REPRODUCING APPARATUS

BACKGROUND OF THE INVENTION

1. Field of the Invention:

The present invention relates to an image reproducing apparatus for reproducing image information recorded on a recording medium such as magnetic sheet, optical disc and the like.

2. Description of the Prior Art:

An image recording system for use as a still video recording apparatus in which a color-difference sequential signal superposed with a DC offset component is recorded on a recording medium, as shown in FIG. 4, for example, has been publicly known in the art.

At the time of reproduction of the recorded image information, the color difference signal is judged by detecting the previously superposed DC offset component.

By detecting such DC offset component, it is possible to judge the kind of the color difference signal and therefore, to reproduce well the recorded image according to the judging result. However, there remains a problem that when it is impossible to properly judge the DC offset component, for example, by some fault on the recording medium the kind of the color difference is misdetected, so that the image is reproduced in different color than the original ones. The U.S. patent application Ser. No. 754,339 filed July 11, 1985, discloses a technique according to which the detecting result of the DC offset component is statistically processed and the color difference line sequential signal is synchronized according to the result of the statistical process in order to avoid the above inconvenience. Although such a technique intends to obtain a superior reproduction operation even in the transient state such as at the change over of the reproduction track or at the start of the reproduction, there still remains much space for further improvement.

SUMMARY OF THE INVENTION

It is, accordingly, an object of the present invention to provide a novel video signal processing apparatus which is always able to carry out a superior process according to the condition of the image signal to be processed.

It is another object of the present invention to provide a novel reproducing apparatus which is always able to properly process the line sequential signal recorded on the recording medium.

According to the present invention the apparatus comprises means for synchronizing the time sequential signal contained in the video signal, means for judging the kind of the line sequential signal for every horizontal frequency period, means for statistically processing the judging result by the judging means so as to control the synchronization means according to the process result and means for suspending the display of the video signal in the displayer so as to compensate the statistical process according to the state of the suspending means.

Other objects and features of the present invention will become clear from the explanations to be made below with reference to the accompanying drawings of the embodiments of the present invention.

DESCRIPTION OF THE PREFERRED EMBODIMENT

Figure 1:
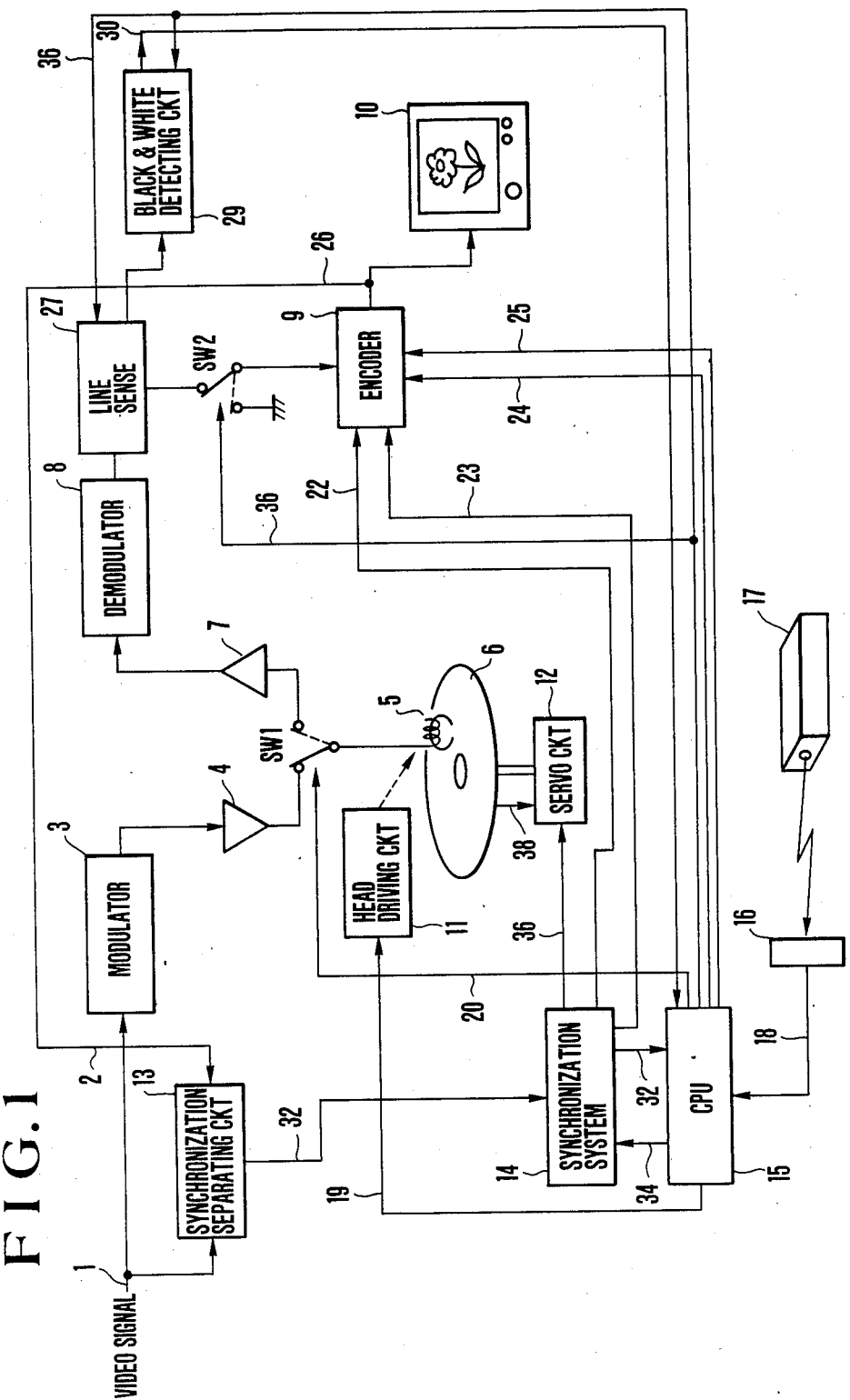
FIG. 1 shows a block diagram of an embodiment of the image reproducing apparatus according to the present invention.

FIG. 1 shows the block diagram of an embodiment of the image reproducing apparatus according to the present invention.

In the drawing, 1 is a video signal containing a color difference line sequential signal to be delivered to a magnetic head 5 via a modulator 3, a recording amplifier 4 and a switch SW1. 6 is a magnetic sheet.

At the time of the reproduction, the switch SW1 is changed over to a pre-amplifier 7 by means of a control signal 20 delivered from CPU 15. Thus, the signal reproduced via the magnetic head 5 is input into an encoder 9 via the pre-amplifier 7, a demodulator 8, a line sense portion 27 and a switch SW2.

In the case of the present embodiment, the video signal 1 which has been separated into the color difference signal and the luminance signal is modulated by the modulator 3 and recorded on the magnetic sheet 6 by means of the magnetic head 3. In order to reproduce the video signal recorded on the magnetic sheet 6 the output of the pre-amplifier 7 is separated into the color difference signal band and the luminance signal band and then demodulated by the demodulator 8.

The line sense portion 27 contains a line sense circuit and synchronizing circuit for synchronizing the color difference signal.

The output of the line sense portion 27 is input into the encoder 9 via the switch SW2 to be explained later.

29 is a black and white detecting circuit for detecting whether the reproduced image signal is that of the color image or that of the black and white image.

The internal construction of the black and white detecting circuit 29 will be explained with reference to FIG. 5.

Figure 2A:
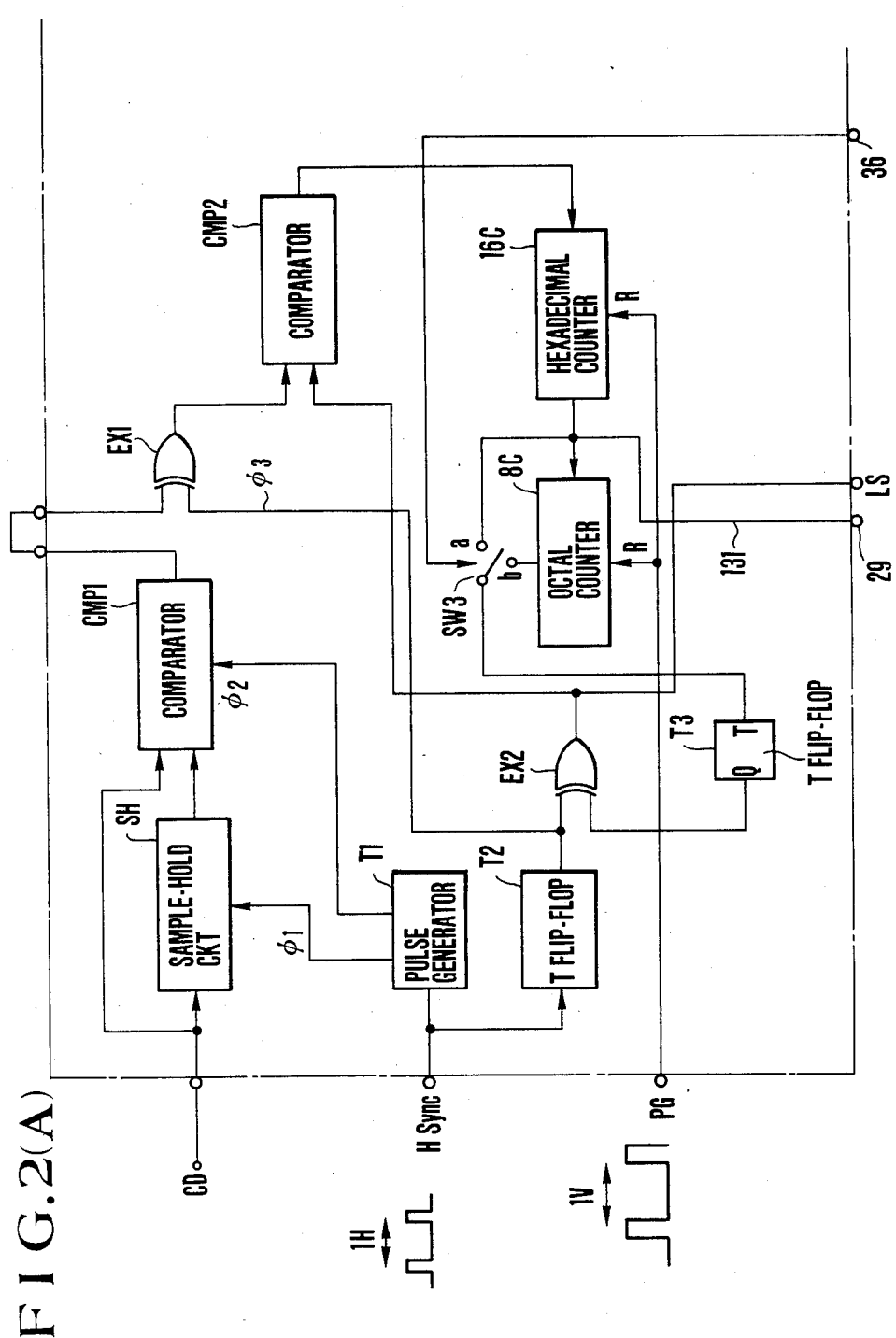
FIG. 2(A) shows a block diagram of a part of the line sense portion shown in FIG. 1.
Figure 2B:
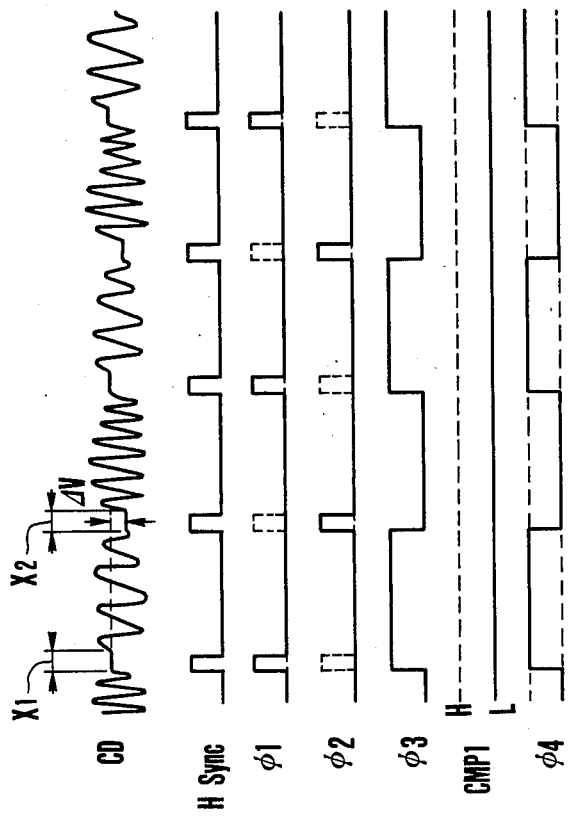
FIG. 2(B) shows a block diagram for explaining the operation of the circuit shown in FIG. 2(A).

FIG. 2(A) shows the detailed diagram of a part of the line sense circuit of the above line sense portion 27, while FIG. 2(B) shows a timing chart for explaining the operation of such a circuit. The DC offset of the color difference signal CD transmitted in color difference line sequence is detected by a sample-hold circuit SH, compared with the reference level in a comparator circuit CMP1 and formed into a line sense switch signal by an exclusive OR gate EX1 in synchronization with the horizontal synchronization signal Hsync input via a pulse generator T1.

The pulse generator T1 consists of a T flip-flop for producing alternatively a high and a low for 1H in accordance with the input horizontal synchronization signal, a one-shot multi-vibrator for producing a pulse $\phi 1$ in synchronization with the rising up of the output of the T flip-flop and another one-shot multi-vibrator for producing the pulse $\phi 2$ in synchronization with the falling down. The sample-hold circuit SH sample-holds the DC offset level according to the timing synchronized with $\phi 1$.

The comparator CMP1 compares the DC offset level of the color difference signal fed according to the timing shown in pulse $\phi 2$ with the DC offset level fed from the sample-hold circuit SH so as to produce a high when the level fed from the sample-hold circuit SH is higher and a low when the level is lower.

The comparator CMP1 holds the comparison result until the next pulse $\phi 2$ is fed. Thus, for example, the comparator CMP1 contains a D flip-flop whose clock input is the pulse $\phi 2$.

The T flip-flop T2 produces alternatively a high and a low for 1H, whereby the output of the T flip-flop T2 is delivered via an exclusive OR gate EX2 according to whether the Q output of a T flip-flop T3 is high or low. The output of the exclusive OR gate EX2 is compared with the output of the exclusive OR gate EX1 in the comparator circuit CMP2. When the output of EX2 does not correspond to that of EX2, the comparator CMP2 delivers pulses which are counted by a counter 16c and whose carries are counted by a counter 8c.

In the state in which the switch SW3 is connected to the b side by the signal 36, the level of Q of the T flip-flop T3 becomes high when the carry output of the counter 8 is obtained. The counters 16c and 8c reveal that the mistakes of the change over signals LS for changing over the color difference signals are more than a certain predetermined degree so that when the level of the Q output of the T flip flop T3 is high, the level of the output of the exclusive OR gate EX2 is high only when that of the output of the T flip-flop T2 is low.

Consequently, the disaccordance between the output of the exclusive OR gate EX1 and that of EX2 becomes more frequently, the polarity of the change over signal LS of the color difference signal is inversed.

The counters 16c and 8c are reset for 1 field unit by the PG pulse for each 1V.

When the switch SW3 has been changed over to the a side by the signal 36 the level of the Q output of the T flip-flop T3 becomes high by means of the carry output of the counter 16c so that the judging speed is increased. The above change over to the a side takes place when the image is muted, for example, during the track shift, when the level of the signal 36 becomes high. Normally, the switch SW3 is at the b side.

In this way, the line sense switch signal LS is formed. It is possible that the line is erroneously sensed in case the S/N ratio of the signal is inferior or the image signal is muted. The above erroneous line sense may be avoided by the majority decision by using the hexadecimal counter 16c and the octal counter 8c. For this purpose, normally the majority decision is taken up for 1 field, while during the travel of the head between the tracks the majority decision is decreased for 16 lines.

The reason is that the line sense can be carried out quickly when the head has been moved to a new track. Thus the signal 36 showing the track travel is input from CPU 15 to the line sense portion.

In the case of the above embodiment, the number of the majority decision is decreased when the S/N ratio of the signal is inferior or the image signal is muted. For the same purpose, a switch SW4 may be provided as shown in FIG. 2(C), so as to be changed over to the right side in the drawing according to the signal 36 in such a manner that the change over signal LS can be obtained directly from the output of the exclusive OR gate EX1, not depending upon the majority decision.

Figure 2C:
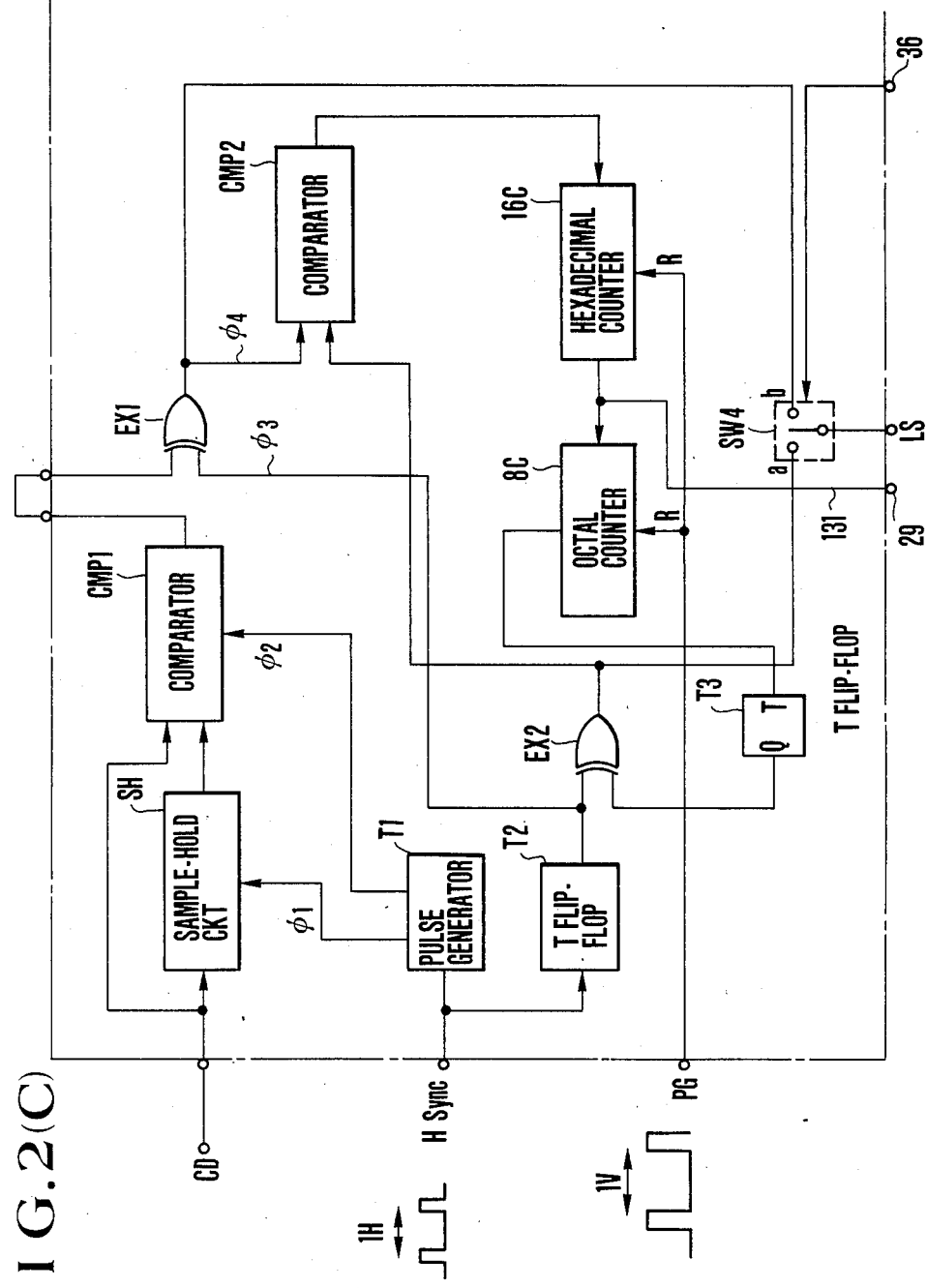
FIG. 2(C) shows a block diagram of another composition of the line sense portion.

In the case of the embodiment shown in FIG. 2(C), the line sense of further quicker response can be carried out.

Figure 3:
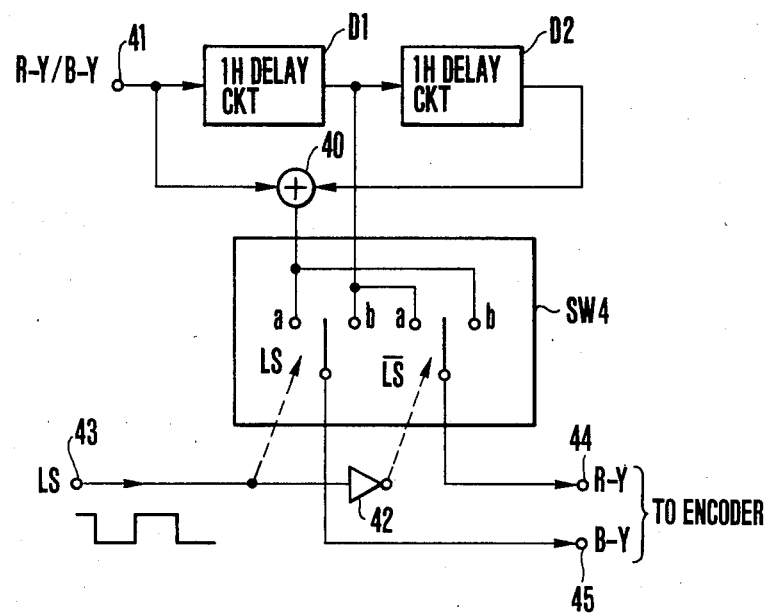
FIG. 3 shows a block diagram of a portion of the line sense portion for carrying out the synchronization process.

The line switch signal LS is used for converting the color difference line sequential signal into the synchronized color difference signal (hereinafter called as line synchronized signal), as shown in FIG. 3.

In FIG. 3, D1 and D2 are 1H (horizontal period) delay circuit, 40 is an adder, 41 is a color difference signal input terminal, SW4 is a switch and 42 is an inverter.

43 is a line switch signal (LS) input terminal, and 44 and 45 are output terminals of the color difference signals (R-Y) and (B-Y), respectively.

When the color difference (B-Y) is fed into the terminal 41, the level of the line switch signal LS becomes high and the switch SW4 is changed over to the a side.

Thus, the original signal (B-Y) and the signal (B-Y) before 2 horizontal periods, are added to each other, and the added signal appears at the output 45, and the signal (R-Y) before 1 horizontal period appears at the terminal 44.

Then, while the signal (R-Y) is being fed into the terminal 41 the level of the line switch signal LS is low so as to change over the switch SW4 to the b side, whereby the signal R-Y into which the original signal R-Y and the signal R-Y before 2 horizontal periods are added to each other is led to the terminal 44, while the signal B-Y before 1 horizontal period is led to the terminal 45.

The explanation will be made with reference to FIG. 1 again. The encoder 9, which has received subcarrier signal 23 from a synchronization system 14 processes the macro system synchronized by the line sense portion 27, for example, modulates it by the subcarrier signal. Further, a burst is put into the image signal by means of a burst flag 25 delivered from CPU 15. Similarly, a letter signal delivered from CPU 15 is added to the image signal. This letter signal serves to display, for example, the date, the time, the track number and the title in a part of the monitor picture. Further, a composite synchronization signal 23 delivered from the synchronization system 14 is added to the image signal so as to deliver the NTSC signal 25 to the monitor 10.

At the time of the recording the input video signal 1 is input into a synchronization separating circuit 13, while at the time of the reproduction, a reproduction video signal 26 is input into the circuit 13. Then, various timing signals are delivered from the synchronization system 14 in synchronization with a synchronizing signal 32 delivered from the synchronization separating circuit 13. Further, it is possible for the synchronization system 14 to produce free run signal by a built-in oscillator.

From this synchronization system 14, the vertical and the horizontal synchronizing signals 32 are delivered to CPU 15. Further, from CPU 15, the control signal 27 for letting the synchronization system 14 free run is delivered.

A vertical synchronization signal 36 is delivered to a servo circuit 12, from the synchronization system 14. The servo circuit 12 rotates the magnetic sheet 6 in synchronization with the synchronization signal 36.

A head driving portion 11 is provided with a step motor so as to move the head 5 among all of the tracks. The control thereof is made by delivering control pulse 19 from CPU 15 to the head driving portion 11. Now, it is assumed that the user wishes to move the head 5 between the tracks and he sends a signal to a light sensing portion 16 by operating a remote control 17. The signal is converted into a pulse 18 by the light sensing portion 16 and delivered to CPU 15. Now, it is supposed that the signal 18 is the one for moving the head 5 from the first track to the 20th. Then, at first, CPU 15 delivers a signal 36 for changing over the switch SW2 to the earth. This signal 36 is delivered to the line sense portion 27 at the same time so as to decrease the judging frequency of the majority decision (excluding the octal counter in FIG. 2).

Thus, the image signal is no longer delivered to the encoder 9, while the subcarrier signal 22, the composite synchronization signal 23, the letter signal 24 and the burst flag 25 continue to be delivered. Thus, from the encoder 9 the image signal 26 including the composite synchronization signal and the burst signal is delivered so that, for example, a black picture appears on the monitor 10.

At this time, the change over control signal 36 of the switch SW2 is changed over into the one before the blanking period, namely several horizontal periods of the vertical synchronization signal, so that the image can completely be erased from the monitor screen. Further, at the same time, the head 5 can be carried between the tracks by sending the head driving pulse 19 to the head driving portion 11. Now, it is supposed that, for example, the head can be carried by one track by 10 pulses. Then, it is possible to move the head from the 1st track to the 20th track by feeding 190 pulses.

By changing over the switch SW2 from the earth side to the line sense portion 27 within the blanking period when the head 5 reaches the 20th track, it is possible to display the image information on the 20th track on the monitor screen 10. At this time, the synchronization system 14 is to be synchronized with the reproduction signal 26. However, there is no reproduction signal during the mute (namely, when the image is erased), so that the synchronization system 14 is held in free run state by the free run control signal 34 and the corresponding synchronization signal is being delivered to the monitor 10.

Further, the servo circuit 12 is matched with the phase of the synchronization signal 28 and that of the PG signal 38 delivered from the rotary sheet 6, so that it is impossible that the vertical synchronization signal in the free run state may deviate largely from that of the reproduction signal 26. Thus, it is impossible for the synchronization to deviate largely even when the mute in the free run state is changed over into the reproduction of the new track.

Further, at the time of the high speed picture feeding it is also possible to mute the no signal portion between the tracks. By this, it is possible to avoid the disturbance of the picture as well as that of the synchronization by carrying out the synchronization quickly at the time of the reproduction of every track so as to realize the picture feeding reproduction convenient to look at.

It is possible to display the letter in the picture even during the mute, so that it is also possible to display in the monitor picture in the mute the track number which is the address of the head, at the time of the random access.

Further, as mentioned above, the control signal of the line sense portion 27 serves at the same time as the control signal of the switch SW2, so that it is not necessary to provide a separate timing signal. Further, the signal line also serves as that from CPU, so that it is not necessary to increase the circuit compositions.

Now, the internal construction of the black and white detecting circuit 29 will be explained with reference to FIG. 5.

Figure 5:
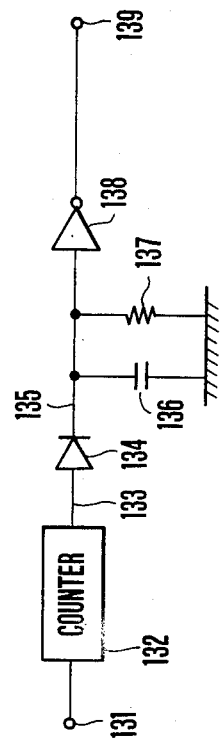
FIG. 5 shows a block diagram of the black and white detecting circuit shown in FIG. 1.

In FIG. 5, 131 indicates an input terminal of the black and white detecting circuit, to which the offset level disaccordance pulses are delivered from the counter 16c of the line sense circuit 27 in FIG. 1. The input pulses are counted by a counter 132 in such a manner that at the time point at which, for example, 8 counts are obtained a pulse 133 appears on the output line. Then, a capacitor 136 is instantaneously charged via a diode 134. By setting, the time constant determined by the capacitor 136 and a resistor 137 longer enough than the 1 field period, the charge voltage is held longer than 1 field period. Thus, a low level output signal continues to be delivered from the output 139 while the charge voltage is above an input threshold level of an inverter 138.

The above operation takes place in case the black and white image signals are detected, whereby in the case of the color image the offset level disaccordance pulses 131 are hardly delivered from the above line sense circuit so that the counter 132 does not deliver the charging pulses 133. Thus, the inverter output 139 presents a high level.

Figure 4:
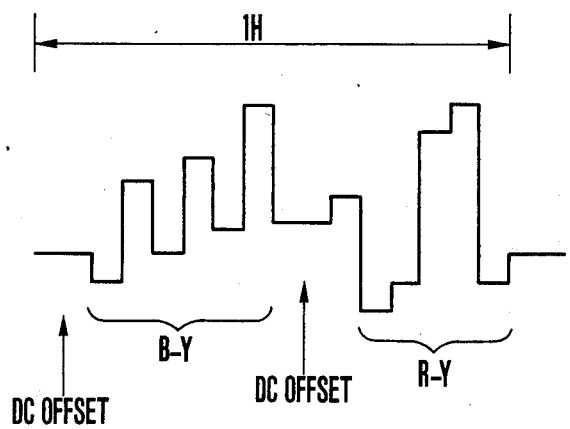
FIG. 4 shows the DC offset portion superposed in the line sequential signal.

Further, in the case of the present embodiment, the DC offset component shown in FIG. 4 is recorded with the color difference signal when the video signal contains the color difference signal in advance, namely, is the one showing the color image, while in the case of the black and white image instead of the color image any color difference including the DC offset is not recorded at all. Thus, at the time of the reproduction, it is possible to detect whether the image signal reproduced by the head 5 is of the color of the black and white, by detecting the level of the DC offset.

Figure 6:
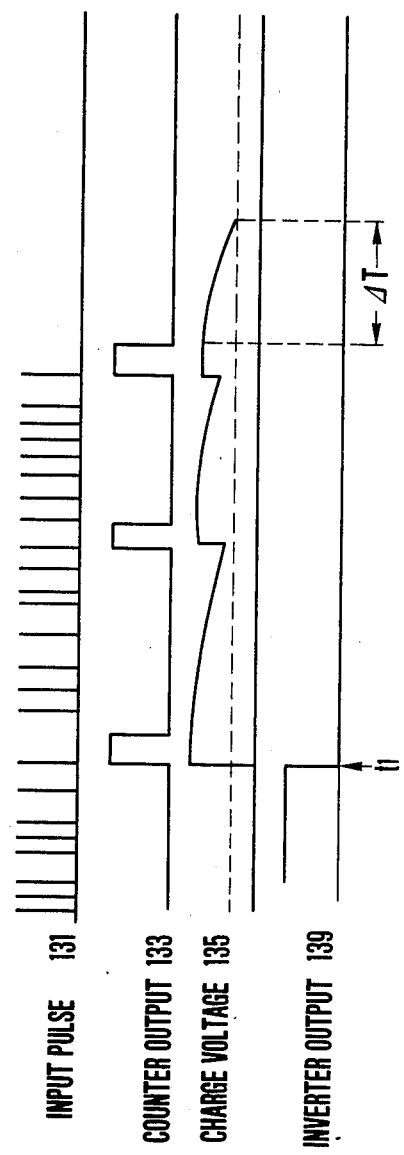
FIG. 6 shows a time chart for explaining the operation of the black and white detecting circuit shown in FIG. 5.

Further, in the case of the above embodiment, the black and white detecting circuit 29 is constructed as is shown in FIG. 5 accordingly, when the image reproduced from the magnetic disc is changed from the color into the black and white, the counter 132 delivers a high level signal and the capacitor 136 is instantaneously charged, so that the inverter output 139 changes from the high level to the low level. This is shown at $t_1$ in the chart of FIG. 6. FIG. 6 shows the time chart for showing the wave form at every part in FIG. 5. When the signal has changed from the black and white image signal to the color image signal, the level of the charge voltage 135 lowers slowly according to the time constant determined by the capacitor 136 and the resistor 137, whereby the counter 132 does not deliver a high level signal, so that the inverter output 139 shown at T in FIG. 6 does not reach the high level until the output 139 reaches the input threshold level of the inverter 138

(namely, the inverter output 139 is kept at the low level over several field intervals).

Thus, the control CPU is unable to give a correct judgement. Especially, when a guard band is provided between the tracks, an errorneous line sense is unavoidably obtained, while the head travels between the tracks with the result that the inverter 139 shows the black and white state. This means that it is impossible to detect whether the image recorded on the new track is the color or the black and white before several field periods have passed after the head has reached the corresponding track. Hereby, when the head travels simply between the tracks, only the detection is delayed, which is not so much important. However, only several field periods are reproduced for each track in order to feed the picture at the high speed, the head moves to the next track before the detection.

Figure 7:
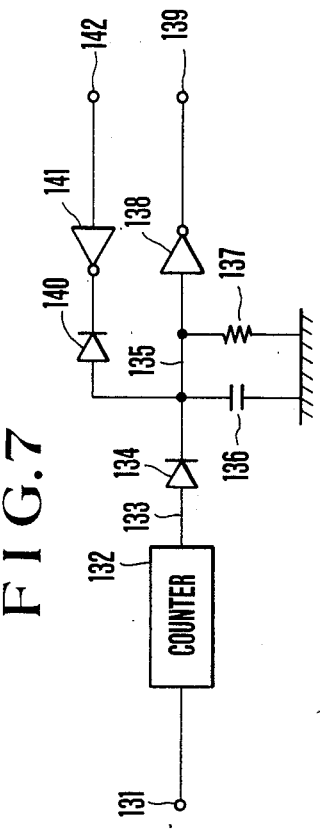
FIG. 7 shows a block diagram of another construction of the black and white detecting circuit.

Consequently, according to another embodiment of the present invention, as is shown in FIG. 7, the black and white detection circuit 29 as the judging means is further provided with a reset means composed of an inverter 141 and a diode 140. Namely, while the head is travelling between the tracks the control signal 36 to be fed into the inverter 141 is kept at high level. Thus, the output of the inverter 141 presents a low level and the capacitor 136 is discharged via the diode 140.

Figure 8:
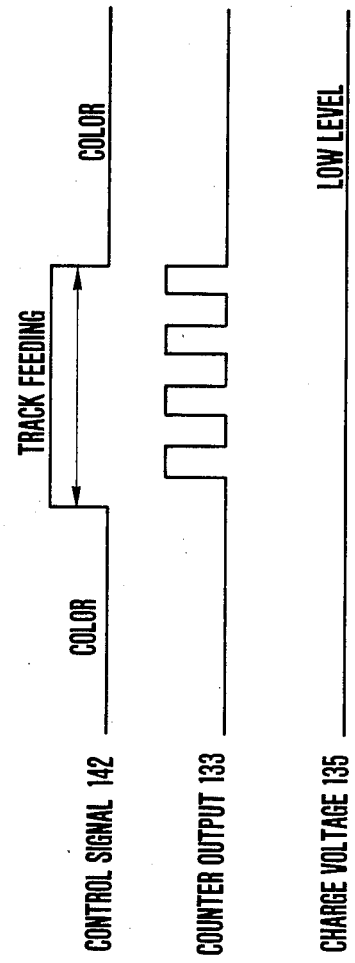
FIG. 8 shows a time chart for explaining the operation of the black and white detecting circuit shown in FIG. 7.

FIG. 8 shows the timing chart for showing the above operation, and while the head is being moving between the tracks a low level charge voltage 135 is always obtained.

Namely, in the circuit shown in FIG. 5, there is such a disadvantage that the black and white state is always detected, while the head is travelling between the tracks, so that even when the color image is to be reproduced after the head has reached the corresponding head, the output of the black and white detecting circuit 29 presents the high level only after delaying for several field periods as mentioned above.

On the other hand, in the case of the embodiment shown in FIG. 7, the charge voltage 135 of the capacitor is always at low level, while the head is travelling the tracks, so that when the color image signal is to be reproduced out of the next track the inverter output 139 immediately assumes the high level. Further, when the black and white image signal is obtained from the next track, the capacitor 136 is immediately charged and the inverter output 139 immediately assumes the low level.

Hereby, at the time of the normal image reproduction, the output of the inverter 141 is at the high level so that the diode 140 is inversedly biased, which gives no influence upon the operation of the black and white detecting circuit 29.

As already explained, even when the head 5 travels between the tracks, it is possible to immediately detect whether the image is the color or the black and white, with reference to the inverter output 139. The output 30 of the black and white detecting circuit 29 is delivered to the CPU 15 so as to cut the sub-carrier signal 22.

As explained above, according to the present embodiment, it is possible to immediately detect whether the image is the color or the black and white even when the head travels between the tracks. Especially, at the time of the high speed picture feeding the present invention is advantageous.

Although in the case of the present embodiment, the magnetic disc is mentioned as the recording medium, it is also possible to use the laser disc and so on. Further, during the mute, it is possible to select the color of the monitor picture as gray or white instead of black.

In order to mute not only during the travel of the head, it is also possible to provide a manual change over mechanics.

As other embodiments:

(1) it is possible to eliminate the letter signal 24, (2) it is also possible to design so as to mute the burst flag 25 and the sub-carrier signal 22 (at the time of the reproduction of the black and the white image), (3) it is not necessary that the timing for change over of the switch SW2 should be several H before the vertical synchronization signal, and (4) no-signal band on the track includes not only the guard band but also the unrecorded track.

What is claimed is:

1. A reproducing apparatus for reproducing a video signal containing line sequential signals comprising:
   (a) rearranging means for rearranging said line sequential signals into line simultaneous signals;
   (b) discriminating means for discriminating the kind of said line sequential signal for every horizontal frequency period;
   (c) processing means for statistically processing results of discrimination effected by said discriminating means so as to control said rearranging means according to the result of processing;
   (d) display stopping means for stopping display of an image produced on a display device according to said video signal; and
   (e) changing means for changing state of processing of said processing means according to state of said display stopping means.

2. A reproducing apparatus according to claim 1, wherein said line sequential signals are color difference line sequential signals.

3. A reproducing apparatus according to claim 1, wherein said line sequential signals comprise two different kinds of information signals and indicative signals identifying the kinds of said information signals, respectively.

4. A reproducing apparatus according to claim 3, wheren said discriminating means is arranged to discriminate the kinds of said line sequential signals, according to said indicative signals.

5. A reproducing apparatus according to claim 1, wherein said processing means includes:
   (a) deciding means arranged to statistically process the results of said discriminating means at predetermined times and to decide the kind of the line sequential signal; and
   (b) control means for controlling said rearranging means according to the decision of said deciding means.

6. A reproducing apparatus according to claim 5, wherein said changing means is arranged to change the predetermined times when the results of the discrimination are statistically processed in said deciding means.

7. A reproducing apparatus according to claim 6, wherein said changing means lowers said predetermined times when said display stopping means operates than when said display stopping means does not operate.

8. A reproducing apparatus according to claim 1, wherein said display stopping means is arranged to mute said video signal.

9. A reproducing apparatus according to claim 1, wherein said reproducing apparatus comprises reproducing means for reproducing video signal containing line sequentail signals from a record bearing medium, and said display stopping means is arranged to operate in response to reproducing state of said reproducing means.

10. A reproducing apparatus according to claim 9, wherein said reproducing means includes a reproducing head which is movable relatively to a position of said record bearing medium.

11. A reproducing apparatus according to claim 10, wherein said display stopping means is arranged to stop a displaying operation of said display device during movement of said reproducing head.

12. A reproducing apparatus for reproducing a video signal containing sequential signals, comprising:
   (a) discriminating means for periodically discriminating kinds of said sequential signals;
   (b) display stopping means for stopping display of an image produced on a display device according to said video signal;
   (c) processing means for statistically processing results of discrimination obtained by said discriminating means at predetermined times; and
   (d) control means arranged to change number of sampling times of the results of discrimination statistically processed by said processing means in response to displaying state of said display means.

13. A reproducing apparatus according to claim 12, wherein said sequential signals are line sequential signals.

14. A reproducing apparatus according to claim 13, wherein said reproducing apparatus comprises rearranging means for rearranging said line sequential signals to line simultaneous signals in response to a result of processing effected by said processing means.

15. A reproducing apparatus according to claim 14, wherein said processing means is arranged to produce an output of a result of the processing which corresponds to a majority of result of discrimination within a predetermined number of results of discrimination obtained by said discriminating means.

16. A reproducing apparatus according to claim 12, wherein said display stopping means is arranged to mute said video signal.

17. A reproducing apparatus according to claim 12, wherein said control means is arranged to reduce the number of results of the discrimination statistically processed by said processing means, in response to operating state of said display stopping means.

18. A reproducing apparatus according to claim 12, wherein said reproducing apparatus is arranged to reproduce a video signal containing sequential signals recorded on a disc-shaped record bearing medium from said disc-shaped medium.

19. A reproducing apparatus according to claim 18, wherein said disc-shaped record, bearing medium is a disc-shaped magnetically recording medium.

20. A reproducing apparatus for reproducing from a record bearing medium an image signal previously recorded on said medium, using a reproducing head which is movable on said record medium, comprising:
   (a) holding means for discriminating whether the image signal recorded on the record bearing medium is a color image signal or a black and white image signal and holding a result of discriminating for a predetermined time; and
   (b) control means for controlling the result of discrimination held in said holding means in a predetermined state, in response to movement of said reproducing head on said record bearing medium.

21. A reproducing apparatus according to claim 20, wherein said holding means includes a capacitor.

22. A reproducing apparatus according to claim 20, wherein said holding means includes:
   (a) discriminating means for discriminating whether the image signal reproduced by said reproducing head is a color image signal or a black and white image signal; and
   (b) means for holding a result of discrimination of said discriminating means for at least one field time.

23. A reproducing apparatus according to claim 20, wherein said control means includes;
   (a) generating means for generating a signal for representing the movement of said reproducing head on said record bearing medium; and
   (b) bringing means for bringing said result of discrimination to said predetermined state in response to said signal generated by said generating means.

24. A reproducing apparatus according to claim 20, wherein said predetermined state is a state of result of discrimination held by said holding means when the image signal recorded on the record bearing medium is discriminated as a color image signal.

25. A reproducing apparatus according to claim 21, wherein said control means is arranged to bring a voltage of said capacitor to a predetermined voltage in response to a movement of said reproducing head on said record bearing medium.

26. A reproducing apparatus according to claim 25, wherein said control means includes a diode connected to said capacitor.

27. A reproducing apparatus according to claim 20, further comprising:
   reproduction processing means for processing the image signal reproduced from said record bearing medium by said reproducing head, depending upon the result of discrimination held by said holding means.

28. A reproducing apparatus according to claim 27, wherein said reproduction processing means is arranged to modulate the color image signal, depending upon the result of discrimination.

29. A reproducing apparatus for reproducing from a record bearing medium an image signal previously recorded on said medium, using a reproducing head which is movable on said record bearing medium, comprising:
   (a) holding means arranged to discriminate a state of the image signal recorded on the record bearing medium and holding a result of discrimination for a predetermined time; and
   (b) control means arranged to control the result of discrimination held in said holding means to a predetermined state, independently of said predetermined time, in response to the movement of said reproducing head on said record bearing medium.

30. A reproducing apparatus according to claim 29, wherein said holding means includes:
   (a) discriminating means for discriminating the state of the image signal recorded on the record bearing medium at a fixed period; and
   (b) holding means for holding the result of discrimination for a period longer than the above-mentioned fixed period.

31. A reproducing apparatus according to claim 29, wherein said determined time is at least one field time.

* * * * *